US007107075B2

(12) United States Patent
Knight

(10) Patent No.: US 7,107,075 B2
(45) Date of Patent: Sep. 12, 2006

(54) WIRELESS COMMUNICATIONS METHODS AND SYSTEMS USING A REMOTE, SELF-CONTAINED COMMUNICATIONS ANTENNA UNIT

(75) Inventor: Clifford Lee Knight, Cape Coral, FL (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 681 days.

(21) Appl. No.: 09/752,307

(22) Filed: Dec. 29, 2000

(65) Prior Publication Data

US 2002/0025836 A1    Feb. 28, 2002

Related U.S. Application Data

(60) Provisional application No. 60/228,244, filed on Aug. 25, 2000.

(51) Int. Cl.
*H04Q 7/28* (2006.01)
(52) U.S. Cl. ............... 455/562.11; 455/11.1; 455/454; 455/521; 455/524
(58) Field of Classification Search ........... 455/562, 455/11.1, 8–9, 512, 520, 524–525, 527, 453, 455/436, 343, 574, 32.3, 126–127, 517–518, 455/422, 450, 451, 452, 454–455, 462, 507, 455/509, 62–63, 621, 575, 12.1, 13.1, 427–431, 455/575.9, 90.3, 561, 916, 67.1, 820, 525.1, 455/448, 562.1, 943, 807–809, 516
See application file for complete search history.

(56) References Cited

U.S. PATENT DOCUMENTS

| | | | | |
|---|---|---|---|---|
| 5,023,930 A | * | 6/1991 | Leslie | ............................ 455/9 |
| 5,081,703 A | | 1/1992 | Lee | |
| 5,187,806 A | | 2/1993 | Johnson et al. | |
| 5,218,715 A | * | 6/1993 | Leslie et al. | ................. 455/15 |
| 5,278,690 A | | 1/1994 | Vella-Coleiro | |
| 5,327,144 A | | 7/1994 | Stilp et al. | |
| 5,657,374 A | | 8/1997 | Russell et al. | |
| 5,724,665 A | | 3/1998 | Abbasi et al. | |
| 5,752,198 A | * | 5/1998 | Frichtel et al. | ............. 455/524 |
| 5,768,683 A | * | 6/1998 | Mulford | .................... 455/11.1 |
| 5,802,452 A | * | 9/1998 | Grandfield et al. | ........... 455/20 |
| 5,826,195 A | | 10/1998 | Westerlage et al. | |
| 5,864,762 A | * | 1/1999 | Childress et al. | ........... 455/509 |
| 5,867,785 A | * | 2/1999 | Averbuch et al. | ........... 455/436 |

(Continued)

FOREIGN PATENT DOCUMENTS

| | | |
|---|---|---|
| EP | 1148579 | 10/2001 |
| WO | WO 98/15027 | 4/1998 |

OTHER PUBLICATIONS

Neil J. Boucher, The Cellular Radio Handbook, pp. 82-87 (Quantum Publishing, PO Box 1738, Mill Valley CA 94942, 415.381.4488) (1995).

(Continued)

*Primary Examiner*—Pablo N. Tran
(74) *Attorney, Agent, or Firm*—Thomas, Kayden, Horstemeyer & Risley

(57) ABSTRACT

This invention provides wireless communications using a remote, self-contained communications antenna unit that transceives signals from a disconnected cell site and communicates these signals with a communications network. In an exemplary embodiment, the remote, self-contained communications antenna unit includes a transportation vehicle that carries a generator for power, backup batteries, transmitter and receiver equipment, a digital signal processor (DSX), a network interface unit, an air conditioner, and an extendible mast.

32 Claims, 2 Drawing Sheets

U.S. PATENT DOCUMENTS

| | | | |
|---|---|---|---|
| 5,901,342 A * | 5/1999 | Heiskari et al. | 455/11.1 |
| 5,907,794 A * | 5/1999 | Lehmusto et al. | 455/11.1 |
| 5,995,804 A * | 11/1999 | Rootsey et al. | 455/11.1 |
| 6,047,160 A * | 4/2000 | Priest et al. | 455/11.1 |
| 6,055,411 A | 4/2000 | Ishida et al. | |
| 6,148,196 A * | 11/2000 | Baumann | 455/427 |
| 6,169,880 B1 * | 1/2001 | La Fratta et al. | 455/11.1 |
| 6,628,941 B1 * | 9/2003 | Knoblach et al. | 455/431 |
| 6,647,244 B1 * | 11/2003 | Haymond et al. | 455/11.1 |
| 6,804,515 B1 * | 10/2004 | McCraw et al. | 455/431 |
| 2002/0072361 A1 * | 6/2002 | Knoblach et al. | 455/431 |

OTHER PUBLICATIONS

Paul Bedell, Cellular/PCS Management, p. 27 (McGraw-Hill, New York, NY) (1999).

National Transportable Telecommunications Capability: Commercial Satellite And Cellular Communications For Emergency Preparedness by Dr. Ronald J. Council & Nicholas J. Sorovacu, Proceedings of the Military Communications Conference (Milcom), New York, IEEE, US, vol. vol. 1, Conf. 11, pp. 137-140, Nov. 10, 1992.

* cited by examiner

WIRELESS COMMUNICATIONS METHODS AND SYSTEMS USING A REMOTE, SELF-CONTAINED COMMUNICATIONS ANTENNA UNIT

PRIORITY APPLICATION

This application claims priority to co-pending U.S. Provisional Application No. 60/228,244, filed Aug. 25, 2000, entitled, "Wireless Communications Methods and Systems Using Remote, Self-Contained Communication Devices," which is fully incorporated herein by reference.

CROSS REFERENCE TO RELATED APPLICATIONS

This application relates to applicant's co-pending Ser. No. 09/752,336 application filed simultaneously herewith, entitled "Wireless Communications Methods And Systems Using A Remote, Self-Contained Cell Site" which is fully incorporated herein by reference.

COPYRIGHT NOTIFICATION

A portion of the disclosure of this patent document and its figures contain material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

1. Field of the Invention

This invention relates generally to the field of wireless communications. More particularly, this invention relates to wireless communications methods and systems for wireless personal communication devices and for interconnecting these wireless personal communication devices over a linking frequency using a remote, self-contained communications antenna unit.

2. Background

Wireless communication networks comprise one or more cell sites that assign radio channels for connecting a wireless personal communication device, such as, for example, a cellular telephone, to another telephone (wireless or wired) through a cellular switch connected to a terrestrial telephone network. Wireless communication networks typically include a plurality of interconnected (wireless or wired) cell sites that are coupled with a centrally located cellular switch, called a Mobile Telephone Switching Office (MTSO), and that connect to a communications network. Cell sites are essentially buildings that house equipment for transmitting, receiving, and processing wireless communications to the communications network. There are typically fifty to one hundred cell sites in large cities, fifteen to fifty cell sites in smaller cities, and very few cell sites or none in rural areas. Depending on capacity constraints, cell sites may be located one-half to twenty miles from each other. Further, each cell site generally comprises one or more stationary antennas mounted on a triangular platform that is placed on a tower or atop a tall building preferably sixty to three hundred feet above the surrounding terrain.

Conventional installation of a new cell site requires placement of one or more antennas and construction of a cable transmission path for a wired connection (e.g., use of a T1) of the cell site to a switching system. The cost associated with installing a new cell site is very substantial and ranges on the average from several hundred thousand to half a million dollars. Additionally, actual siting may not be available for a variety of reasons, such as unavailability of the sector for the physical plant that contains the cell site, terrain restraints, regulatory restraints, and the like.

When the wired connection is lost to a conventional cell site, the cell site is disconnected and goes "off the air." Wireless personal communication devices serviced by the disconnected cell site cannot transmit or receive signals (i.e., a customer cannot place or receive a telephone call). Depending on the nature of the trouble, the cell site could be off the air for an extended period of time. Loss of revenue to the cellular provider and customer inconvenience result until the wired connection is repaired and restored. While there are techniques known in the art that provide emergency means in case of a line fault, they: (1) are bulky and difficult to readily implement; (2) are expensive; and (3) have a limit in the number of applicable connections and in the applicable status of a connection.

Thus, replacement methods and systems are needed to provide easy, affordable, and flexible remote wireless communications with wireless personal communication devices communicating with a disconnected cell site and to connect these devices with a communications network.

SUMMARY OF THE INVENTION

This invention provides wireless communications using a remote, self-contained communications antenna unit coupled to a disconnected cell site to communicate with a cellular system connected to a communications network. As used herein, a "disconnected" cell site includes remote cell sites, such as, for example, a cell on wheels (COW) and also includes conventional cell sites (i.e., buildings with cellular transceiving equipment) that have lost connection with a cellular switch (e.g., the T1 is cut or there is another line fault) and are "off the air." As used herein, the term "transceive" includes transmitting, receiving, and processing communication signals. Further, as used herein, a "communications network" includes terrestrial communications networks, such as, for example, the public switch telephone network, as well as celestial communications networks. When the remote, self-contained communications antenna unit is coupled (e.g., wired or wireless connection) to a disconnected cell site, it has the appearance of a operational cell site to the communications network. This invention provides a rapid, inexpensive, and efficient method and system to transceive wireless communication signals (e.g., the Industrial, Scientific, and Medical (ISM) Band frequencies, such as, 2.4–2.5 GHz, cellular telephone frequencies, such as, 806–960 MHz, 1710–1855 MHz, and 2500–2690 MHz, paging frequencies, digital processing frequencies, and any other frequency in the electromagnetic spectrum) from wireless personal communication devices communicating with a disconnected cell site and to connect these wireless personal communication devices with the communications network. Further, this invention is easily positioned at a variety of locations because of the highly mobile platforms that carry the remote, self-contained communications antenna unit.

The remote, self-contained communications antenna unit is coupled with a disconnected cell site to provide remote communications with wireless personal devices. The wireless personal devices transceive radio frequencies to the disconnected cell site, and these signals are communicated to the remote, self-contained communications antenna unit. The remote, self-contained communications unit transceives these signals to the communications network. In one embodiment, the remote, self-contained communications antenna unit may be hard-wired using a T-1 connection to a local service provider's crossbox junction point that connects to a cellular switch, such as, for example, a MTSO. In a second embodiment, the remote, self-contained communications antenna unit transceives these signals using a microwave frequency link to an operational cell site. The operational cell site connects these signals to the MTSO and the communications network. In a third embodiment, the remote, self-contained communications antenna unit transceives these signals to a second remote, self-contained communications antenna unit that is connected to an operational cell site. The second remote, self-contained communications antenna unit may be used as an alternative to a direct connection with an operational cell site when there are obstacles (e.g., terrain obstruction) between the remote, self-contained communications antenna unit coupled with the disconnected cell site and the operational cell site.

The remote, self-contained communications antenna unit includes a power source, backup power source, transceiving equipment, a signal processor, network communications equipment, antenna, and an antenna mast for transmitting and receiving wireless communications at various heights. Further, the remote, self-contained communications antenna unit may be mounted upon a transportation vehicle.

In a preferred embodiment, the remote, self-contained communications antenna unit is a trailer that transports and carries a generator for power, backup batteries, transceiving equipment, a digital signal processor (DSX), a network interface unit (NIU), an air conditioner, an antenna, and an extendible mast that supports the antenna. The remote, self-contained communications antenna unit also includes a power charging unit, such as a battery charger.

This invention is useful for restoring cell site functionality, for providing emergency service, for increasing cellular capacity, and for adding a remote, self-contained communications antenna unit coupled with a disconnected cell site. For instance, this invention provides cellular service where a line fault has disconnected the conventional cell site and caused it to go "off the air" (e.g., the T1 connection to the terrestrial telephone network has been cut). It provides service to a location out of range of cell sites, such as service to a rural location. This invention is also useful for temporarily increasing cellular capacity, such as, for example, providing cellular coverage to customers attending large events like the SuperBowl and the Olympics. Further, this invention is useful for adding a permanent cell site when laying a transmission path to a switching system is difficult or impossible or when adding a permanent cell site is too costly.

These uses may be accomplished singularly, or in combination, in one or more of the embodiments of the this invention.

Additional uses, objects, advantages, and novel features of the invention are set forth in the detailed description that follows and will become more apparent to those skilled in the art upon examination of the following or by practice of the invention.

BRIEF DESCRIPTION OF THE FIGURES

Other uses, objects, advantages, and novel features of this invention are more clearly understood by reference to the following and the accompanying figures, in which.

DETAILED DESCRIPTION

The following is presented by way of example and should not be construed as limiting the inventive concept to any particular configuration.

In conventional wireless communications networks, a plurality of interconnected switching systems are coupled with a plurality of cell sites that transmit and receive signals to wireless personal communication devices. This invention allows wireless communication service providers to rapidly, inexpensively, and efficiently provide wireless communication coverage to restore functionality to a disconnected cell site.

Figure 1:
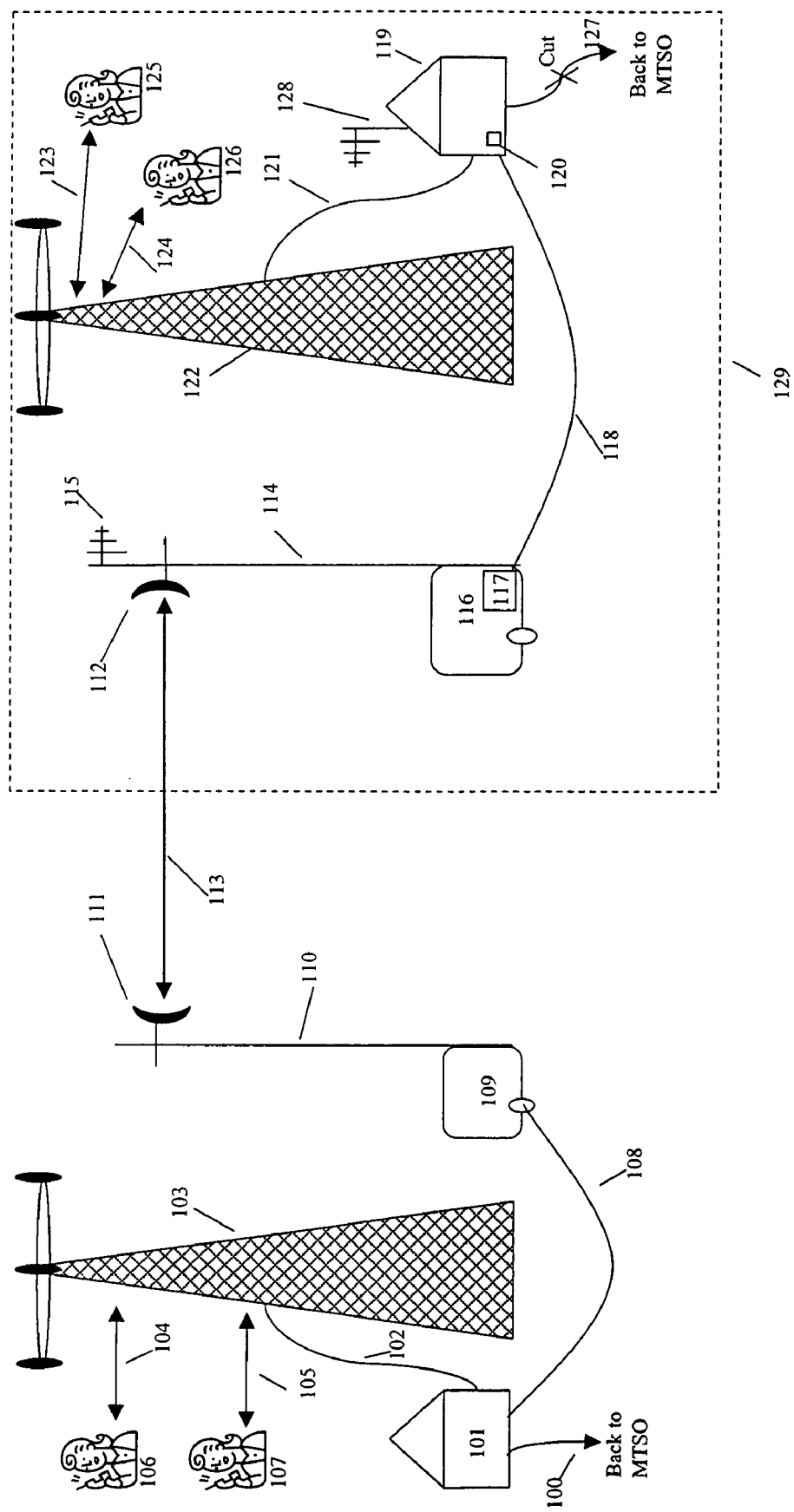
FIG. 1 illustrates the communications paths using a first remote, self-contained communication antenna unit of this invention coupled with a disconnected cell site to communicate signals to a second remote, self-contained communications antenna unit of this invention coupled with an operational cell site.

FIG. 1 depicts the communications paths using remote, self-contained communications antenna unit 116 coupled with disconnected cell site 119 and using another remote, self-contained communication antenna unit 109 connected to the communications network through cell site 101. Cell site 101 is said to be "on the air" when it is connected to a switching system of the communications network, such as the MTSO, over a wired medium 100. Disconnected cell site 119 is said to be "off the air" or "disconnected" when it is not connected to a switching system of the communications network, such as when a conventional cell site's T1 cable to the MTSO is cut 127.

Cell site 101 connects wireless personal devices 106, 107 with the communications network. Cell site 101 is coupled to an antenna 103 using a wired medium 102. Cell site 101 is capable of transceiving signals 104, 105 with a plurality of wireless personal communication devices 106, 107 and is capable of communicating signals 104, 105 over the communications network. Cell site 101 is connected to a remote, self-contained communications antenna unit 109 using a wired medium 108, such as a T1 cable. Alternatively, wireless communications could be used to establish a connection between cell site 101 and remote, self-contained communications antenna unit 109.

Remote, self-contained communications antenna unit 109 includes a mast 110 that supports a microwave antenna 111. Microwave antenna 111 transceives signals with microwave antenna 112 of remote, self-contained communications antenna unit 116 on a linking frequency signal 113. Mast 114 supports microwave antenna 112 and radio frequency antenna 115. Remote, self-contained communications antenna unit 116 may use a wired medium 118, such as a T1 cable, to connect Network Interface Unit (NIU) 117 to Customer Service Unit (CSU) 120. Alternatively, remote, self-contained communications antenna unit 116 may use wireless communications to communicate with disconnected cell site 119. For example, radio frequency antenna 115 may transceive signals with radio frequency antenna 128. Disconnected cell site 119 is coupled to antenna 122 using a wired medium 121. Disconnected cell site 119 is capable of transceiving signals 123, 124 with a plurality of wireless personal communication devices 125, 126 and is capable of communicating signals 123, 124.

Figure 2:
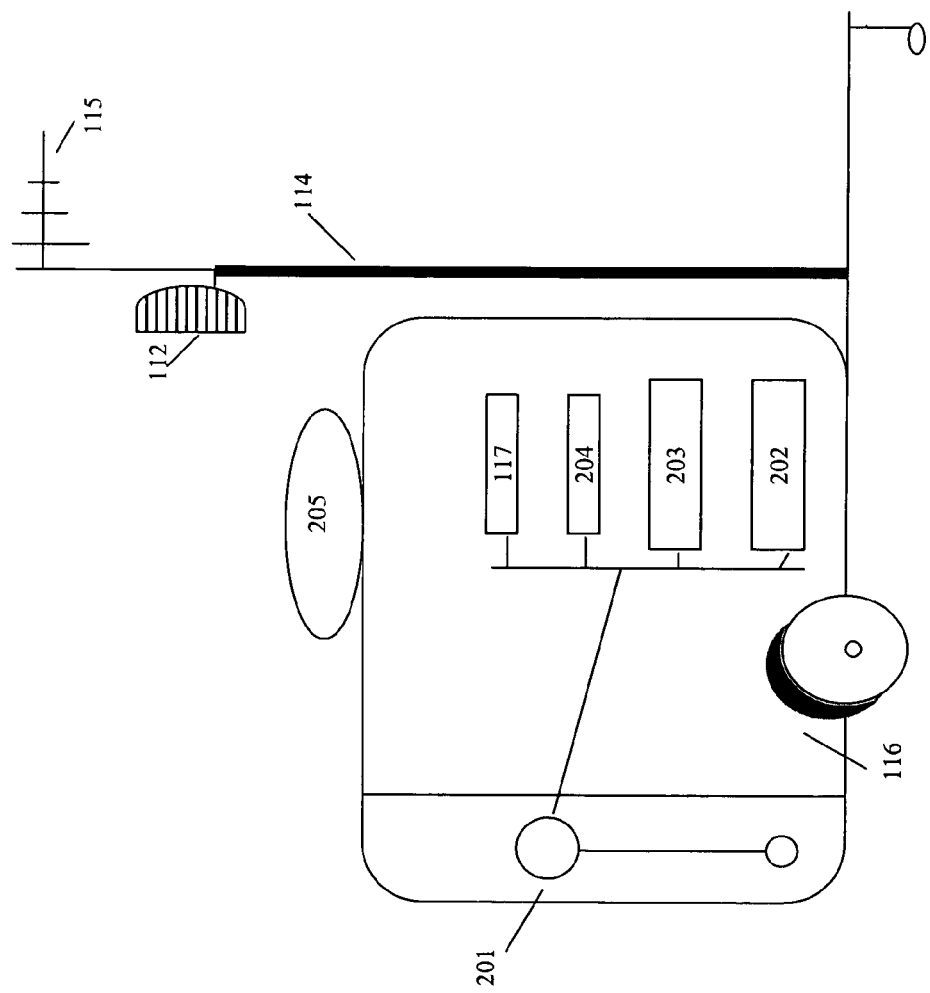
FIG. 2 is a more detailed schematic diagram of the remote, self-contained communications antenna unit of this invention shown in FIG. 1.

FIG. 2 illustrates an exemplary remote, self-contained communications antenna unit 116 that includes a generator 201, backup batteries 202, transceiving equipment 203, a digital signal processor (DSX) 204, a network interface unit (NIU) 117, an air conditioner 205, and an extendible mast 114 that supports microwave antenna 112 and radio frequency antenna 115. The remote, self-contained communications antenna unit 116 is easily assembled, housed, and transported on a light trailer. Additionally, components 117, 201–204 are configured in a flexible manner such as by mounting them in racks that allows each component to be easily removed and replaced with minimal time and labor resources.

The remote, self-contained communications antenna unit coupled with a disconnected cell site 129 has the appearance of an "on the air" cell site and provides the means to establish wireless communications between the communications network and wireless personal communication devices 125, 126. In an illustrative embodiment, the remote, self-contained communications antenna unit 116 functions as follows. When cell site 119 is disconnected and goes "off the air" (e.g., the T1 connection is cut), a remote, self-contained communications antenna unit 116 is mobilized. The remote, self-contained communications antenna unit 116 is positioned near or at the disconnected cell site 119 to re-establish communications with the communications network. The trailer that transports the remote, self-contained communications antenna unit 116 is small enough to be placed near the disconnected cell site 119 and the extendable mast 114 supporting microwave antenna 112 and radio frequency antenna 115 is raised. A wired medium 118 is used to connect the CSU 120 to the NIU 117.

NIU 117 is connected to microwave radio 203, and a signal is transmitted up mast 114 to the microwave antenna 112. The microwave antenna 112 transmits the signal to a nearby cellular system, such as another remote, self-contained communications antenna unit 109 coupled to a "on the air" cell site 101. Alternatively, remote, self-contained communications antenna unit 109 could be coupled using a wired medium to a local service provider's crossbox junction point. Mast 110 is raised along with a matching microwave antenna 111. The two microwave antennas 111, 112 are aligned using extendible masts 110, 114 and signals 123, 124 from wireless personal communication devices 125, 126 are immediately and conveniently communicated to the communications network.

Further details on these embodiments, other possible embodiments, and additional methods and systems of the this invention are set forth below.

The wired mediums discussed above may be a fiber, cable, or other carrier medium.

In alternate embodiments, this invention can be mounted on a variety of conventional and non-conventional transportation vehicles, such as, for example, motorized vehicles (e.g., a car, a boat, an airplane, or a helicopter) and non-motorized vehicles (e.g., a utility trailer or a hot-air balloon).

The equipment and communication methods of the remote, self-contained communications antenna unit are usable with all wireless communication products, methods, and frequencies. They are usable with cellular/PCS phones, wireless computers and modems, wireless personal data assistants, global positioning devices, and any other wireless data, voice, or video communications devices. They are usable with satellite phones and satellite communications technology. They are usable with code-division multiple access (CDMA) technologies, time-division multiple access (TDMA) technologies, the global system for mobile communications (GSM) technology, and other technologies. Further, they are usable with all frequencies in the electromagnetic spectrum and are compatible with the June 2000 World Radiocommunication Conference agreement on third-generation cellular telephony.

Additionally, range of operation of the remote, self-contained communications antenna unit is partially a function of transmitter power, and is, therefore, a matter of choice. Antenna selection and siting is also a matter of choice. For example, omnidirectional or directional antennas can be used. Additionally, the remote, self-contained communications antenna unit may include diversity reception of mobile signals in various embodiments of the this invention. Further, linking frequency signal 113 may be in the microwave or other communications band and is the medium over which the remote, self-contained communications antenna unit site communicates with communicates with a cellular system connected to the communications network.

In other various embodiments, the remote, self-contained communications antenna unit includes other useful components. For example, the trailer used to transport the remote, self-contained communications antenna unit includes stabilizing equipment, such as a scissors jack to provide improved trailer stability. Another example is that the mast of the remote, self-contained communications antenna unit may be a telescopic mast that quickly and easily allows the mast to be extended and collapsed.

Various embodiments of the invention have been described in fulfillment of the various objects of the invention. It should be recognized that these embodiments are merely illustrative of the principles of this invention. Numerous modifications and adaptations thereof will be readily apparent to those skilled in the art without departing from the spirit and scope of this invention.

What is claimed is:

1. A remote, self-contained communications antenna apparatus for establishing wireless communications, comprising:
   equipment for
      transceiving communication signals between said equipment and a disconnected cell site that has been disconnected from its cellular system, and
      transceiving communication signals between said equipment and a communications network;
   a mast for extending and collapsing an antenna; and
   communication link means for setting up communication between the remote, self-contained communications antenna apparatus and the disconnected cell site.

2. The apparatus of claim 1, wherein said communication signals between said equipment and said disconnected cell site are for wireless paging devices.

3. The apparatus of claim 1, wherein said communication signals between said equipment and said disconnected cell site are for digital processing devices.

4. The apparatus of claim 1, wherein said wireless communication signals between said equipment and said disconnected cell site comprise any frequency signal in the electromagnetic spectrum.

5. The apparatus of claim 1, wherein said communications network comprises a celestial communications network.

6. The apparatus of claim 1, wherein said communications network comprises a terrestrial communications network.

7. The apparatus of claim 1, wherein said disconnected cell site transceives wireless communication signals with a wireless device; and
   wherein said equipment comprises:

a power source for providing power to said remote, self-contained communcations antenna apparatus;
a backup power source for providing backup power to said remote, self-contained communications antenna apparatus;
a charging source for
charging said power source, and
charging said backup power source;
transceiving equipment for
transmitting and receiving said communication signals between said equipment and said disconnected cell site, and
transmitting and receiving said communication signals between said equipment and said communications network;
network interface equipment for
processing said communication signals between said equipment and said disconnected cell site, and
processing said communication signals between said equipment and said communications network;
a control unit for
managing said communication signals between said equipment and said disconnected cell site, and
managing said communication signals between said equipment and said communications network;
a data storage unit for storing data associated with
said communication signals between said equipment and said disconnected cell site, and
said communication signals between said equipment and said communications network;
environmental control equipment for controlling temperature; and
stabilizing equipment to secure and balance the attachment of said equipment to a vehicle;
wherein said control unit comprises a personal computer;
said vehicle comprises a trailer;
said vehicle is motorized;
said charging source charges said vehicle;
said mast comprises an extendible mast;
said signal processor comprises a digital signal processor
said power souce comprises a gasoline-powered generator;
said backup power source is a solar-powered generator; and
said network interface equipment communicates with a customer service unit of said disconnected cell site using wireless communications.

8. The apparatus of claim 7, wherein said wireless device comprises at least one of the following:
(a) a phone;
(b) a computer;
(c) a modem;
(d) a pager;
(e) a personal data assistant;
(f) a global positioning system receiver; and
(g) an interactive television.

9. The apparatus of claim 1, wherein said equipment comprises one or more of the following:
a power source for providing power to said remote, self-contained communications antenna apparatus;
a backup power source for providing backup power to said remote, self-contained communications antenna apparatus;
a charging source for
charging said power source, and
charging said backup power source;
transceiving equipment for
transmitting and receiving said communication signals between said equipment and said disconnected cell site, and
transmitting and receiving said communication signals between said equipment and said communications network;
network interface equipment for
processing said communication signals between said equipment and said disconnected cell site, and
processing said communication signals between said equipment and said communications network;
a control unit for
managing said communication signals between said equipment and said disconnected cell site, and
managing said communication signals between said equipment and said communications network;
a data storage unit for storing data associated with
said communication signals between said equipment and said disconnected cell site, and
said communication signals between said equipment and said communications network;
environmental control equipment for controlling temperature; and
stabilizing equipment to secure and balance said equipment.

10. The apparatus of claim 9, wherein said control unit comprises a personal computer.

11. The apparatus of claim 9, wherein said mast comprises an extendible mast.

12. The apparatus of claim 9, wherein said signal processor comprises a digital signal processor.

13. The apparatus of claim 9, wherein said signal processor comprises an analog signal processor.

14. The apparatus of claim 9, wherein said power source comprises at least one of the following:
(a) a gasoline-powered generator;
(b) a solar-powered generator; and
(c) an electrical-powered generator.

15. The apparatus of claim 9, wherein said network interface unit communicates with a customer service unit of said disconnected cell site using wireless communications.

16. The apparatus of claim 9, wherein said network interface unit communicates with a customer service unit of said disconnected cell site using a wired medium.

17. The apparatus of claim 1, wherein said equipment is attached to a vehicle.

18. The apparatus of claim 17, wherein said vehicle comprises a trailer.

19. The apparatus of claim 17, wherein said vehicle comprises a motorized vehicle.

20. The apparatus of claim 19, wherein said charging source further charges said motorized vehicle.

21. The apparatus of claim 1, wherein the communication signals between said equipment and said disconnected cell site are signals of wireless communications.

22. The apparatus of claim 21, wherein said wireless communication signals between said equipment and said disconnected cell site are transceived at 806–960 MHz.

23. The apparatus of claim 21, wherein said wireless communication signals between said equipment and said disconnected cell site are transceived at 1710–1855 MHz.

24. The apparatus of claim 21, wherein said wireless communication signals between said equipment and said disconnected cell site are transceived at 2500–2690 MHz.

25. The apparatus of claim 21, wherein said wireless communication signals between said equipment and said disconnected cell site are transceived at 2.4–2.5 GHz.

26. The apparatus of claim 1, wherein the communication signals between said equipment and said communication network are signals of wireless communications.

27. The apparatus of claim 26, wherein said wireless communication signals between said equipment and said communications network are transceived at 806–960 MHz.

28. The apparatus of claim 26, wherein said wireless communication signals between said equipment and said communications network are transceived at 1710–1855 MHz.

29. The apparatus of claim 26, wherein said wireless communication signals between said equipment and said communications network are transceived at 2500–2690 MHz.

30. The apparatus of claim 26, wherein said wireless communication signals between said equipment and said communications network are transceived at 2.4–2.5 GHz.

31. The apparatus of claim 26, wherein said wireless communication signals between said equipment and said communications network comprise any frequency signal in the electromagnetic spectrum.

32. A method for establishing wireless communications, comprising:
  transceiving wireless communication signals between a wireless device and a disconnected cell site that has been disconnected from its cellular system; and
  transceiving communication signals between said disconnected cell site and a remote, self-contained communications antenna apparatus with a mast for extending and collapsing an antenna;
  transceiving communication signals between said remote, self-contained communications antenna apparatus and a communications network; wherein communication between the remote, self-contained communications antenna apparatus and the disconnected cell site is set up via a communication link means.

* * * * *